(No Model.)
T. E. GREGG.
CULTIVATOR.
No. 308,490. Patented Nov. 25, 1884.
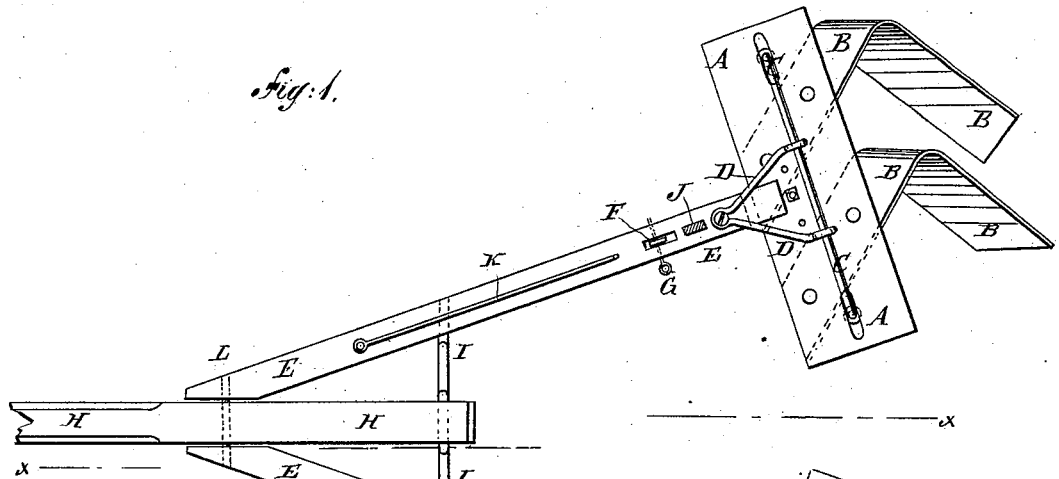
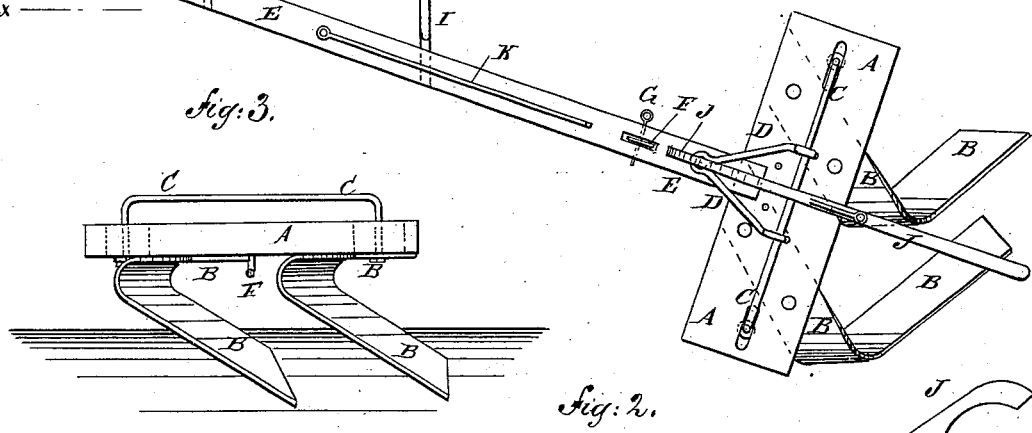
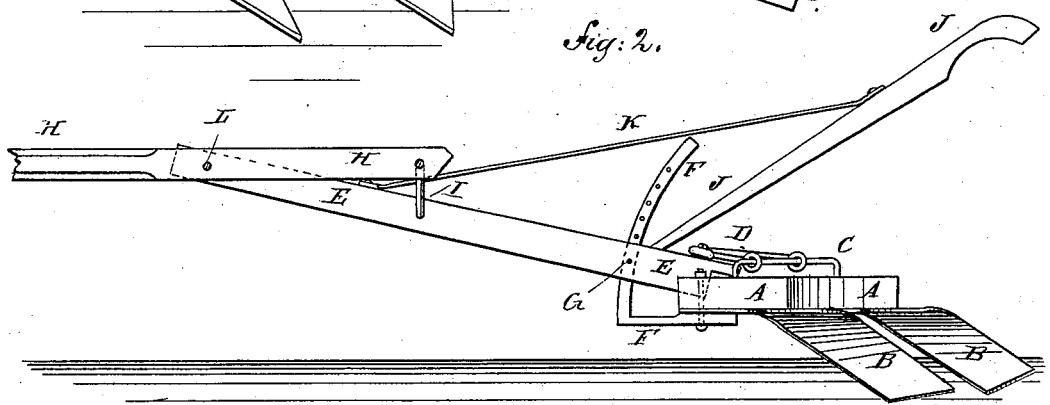
WITNESSES:
INVENTOR:
T. E. Gregg
BY Munn & Co
ATTORNEYS.

UNITED STATES PATENT OFFICE.

THOMAS EDWARDS GREGG, OF MINERAL SPRING, SOUTH CAROLINA.

CULTIVATOR.

SPECIFICATION forming part of Letters Patent No. 308,490, dated November 25, 1884.

Application filed April 30, 1884. (No model.)

*To all whom it may concern:*

Be it known that I, THOMAS E. GREGG, of Mineral Spring, in the county of Marion and State of South Carolina, have invented a new and useful Improvement in Cultivators, of which the following is a full, clear, and exact description.

Reference is to be had to the accompanying drawings, forming a part of this specification, in which similar letters of reference indicate corresponding parts in all the figures.

Figure 1 is a plan view of my improvement, parts being broken away. Fig. 2 is a sectional side elevation of the same, taken through the line $x\ x$, Fig. 1. Fig. 3 is a front elevation of one of the cross-beams and its blades and keeper.

The object of this invention is to facilitate the cultivation of cotton and other plants planted in rows or drills, and also to promote convenience in adjusting the cultivators to work deeper or shallower in the soil.

The invention consists in the combination of parts and their construction, substantially as hereinafter fully set forth and claimed.

A represents two cross-beams, to the lower side of each of which are attached the inwardly-inclined forward ends of two or more blades, B. The rear or working ends of the blades B are twisted downward and inward, as shown in the drawings.

To the slotted end parts of the upper side of each cross-beam A are attached the ends of a long keeper, C, which passes through eyes formed in the ends of a V-shaped bail, D. The bail D is secured at its angle to the upper side of the rear end of the bar E. With this construction the cross-beams A can be adjusted farther apart or nearer together by moving them outward or inward upon the keepers C.

To the under side of the middle parts of the cross-beams A are attached the rear ends of the bars F, which project forward beneath the rear ends of the bars E, are bent upward at right angles, and pass through slots in the said bars E at a little distance from their rear ends. The upwardly-projecting parts of the bars F are curved to the rearward in the arcs of circles having their centers in the axes of the keepers C, and have a number of holes formed through them to receive the pins G, which also pass through holes in the bars E, so as to fasten the said bars F in any position into which they may be adjusted. Several holes are formed in the cross-beams A to receive the bolts for fastening the bars F, so that the said bars can be adjusted to correspond with the adjustment of the said cross-beams A. With this construction, by adjusting the bars F in the bars E, the cross-bars A will be turned to cause the blades B to work deeper or shallower in the soil, the keepers C turning in the eyes of the bails D. The bars E incline toward each other, and their forward ends are secured to the opposite sides of the tongue H, at a little distance from its rear end, by a bolt, L. The inclined bars E are further connected with the tongue H by the rod I, which passes through the rear end of the said tongue H. The arms of the rod I are bent downward and then outward, and their ends are attached to the bars E. By this construction the bars E incline inward toward their forward ends, as shown in Fig. 1, and downward toward their rear ends, as shown in Fig. 2.

To the rear part of each bar E is attached the forward end of a handle, J, which is strengthened in position by a brace-rod, K. The rear end of the brace K is attached to the rear part of the handle J, and its forward end is attached to the forward part of the bar E.

Having thus described my invention, I claim as new and desire to secure by Letters Patent—

1. In a cultivator, the combination, with the beam A, of the twisted blades B, with oblique upper portions connected to said beam, and with their lower portions extending downwardly and obliquely to their upper portions, and having their front edges presented obliquely to the line of draft, substantially as and for the purpose set forth.

2. In a cultivator, the combination, with the inclined bars E and the cross-beams A, having twisted blades B, of the keepers C, the bails D, and the bent bars F and their fastening-pins, substantially as herein shown and described, whereby the said cross-beams and their blades can be readily adjusted and will be securely held, as set forth.

THOMAS EDWARDS GREGG.

Witnesses:
EDWARD WILLIAM JOHNSON,
ROBERT LESLY LANE.